US010513977B2

United States Patent
DeFelice et al.

(10) Patent No.: US 10,513,977 B2
(45) Date of Patent: *Dec. 24, 2019

(54) ADJUSTABLE SNAP ACTION PASSIVE INLINE AIR VALVE

(71) Applicant: Hamilton Sundstrand Corporation, Charlotte, NC (US)

(72) Inventors: Robert DeFelice, South Windsor, CT (US); Scott W. Simpson, Easthampton, MA (US); Josh Kamp, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/913,023

(22) Filed: Mar. 6, 2018

(65) Prior Publication Data

US 2019/0277194 A1 Sep. 12, 2019

(51) Int. Cl.
*F16K 1/12* (2006.01)
*F02C 6/08* (2006.01)
(Continued)

(52) U.S. Cl.
CPC .............. *F02C 6/08* (2013.01); *F01D 17/105* (2013.01); *F02C 7/26* (2013.01); *F02C 9/52* (2013.01); *F04D 27/0215* (2013.01); *F16K 15/026* (2013.01); *F04D 27/023* (2013.01); *F05D 2260/38* (2013.01); *F16K 1/126* (2013.01); *F16K 21/04* (2013.01); *Y10T 137/3421* (2015.04)

(58) Field of Classification Search
CPC ...... F02C 6/08; F16K 1/126; Y10T 137/3367; Y10T 137/3421; Y10T 137/7835

USPC ......................................................... 415/144
See application file for complete search history.

(56) References Cited

U.S. PATENT DOCUMENTS 2,950,732 A  8/1960 Lambert
3,003,516 A * 10/1961 Granberg .............. G01F 15/005
                                                        137/220
(Continued)

FOREIGN PATENT DOCUMENTS

EP            3070336 A1    9/2016
WO       WO 2010086215 A1  8/2010

OTHER PUBLICATIONS

Extended European Search Report dated Jul. 9, 2019, received for corresponding European Application No. 18248278.6.

*Primary Examiner* — Robert K Arundale
(74) *Attorney, Agent, or Firm* — Kinney & Lange, P.A.

(57) ABSTRACT

A valve assembly includes a piston housing inside a flow duct between an inlet and an outlet so as to form an annular flow passage between the flow duct and the piston housing. The piston housing is axially aligned with a center axis of the flow duct. A piston is inside the piston housing and is configured to extend downstream of the piston housing in a closed position. A spring biases the piston to the open position. A fluid chamber is between the piston and an upstream end of the piston housing. A control opening extends through the upstream end of the piston housing and fluidically communicates with the flow duct and the fluid chamber. A control piston and a control spring are inside the piston housing. The control spring biases the control piston toward a first position that obstructs the control opening.

20 Claims, 4 Drawing Sheets

(51) Int. Cl.
*F01D 17/10* (2006.01)
*F04D 27/02* (2006.01)
*F02C 7/26* (2006.01)
*F02C 9/52* (2006.01)
*F16K 15/02* (2006.01)
*F16K 21/04* (2006.01)

(56) References Cited

U.S. PATENT DOCUMENTS

| | | |
|---|---|---|
| 3,155,108 A | 11/1964 | Kahn et al. |
| 3,586,033 A * | 6/1971 | Hieber .................. B64D 39/06 137/220 |
| 3,925,026 A | 12/1975 | Bray et al. |
| 6,230,734 B1 * | 5/2001 | Grebnev ................ F16K 1/123 137/220 |
| 8,011,382 B2 | 9/2011 | Franconi |
| 8,910,653 B2 | 12/2014 | McAuliffe et al. |
| 9,784,184 B2 | 10/2017 | Marocchini et al. |
| 10,001,026 B2 * | 6/2018 | Schwalm .................. F02C 6/08 |
| 2002/0005217 A1 * | 1/2002 | Lyons .................... F16K 1/126 137/220 |
| 2016/0237913 A1 | 8/2016 | Marocchini et al. |
| 2016/0273450 A1 | 9/2016 | Marocchini et al. |
| 2017/0342853 A1 | 11/2017 | Schwalm et al. |

\* cited by examiner

ADJUSTABLE SNAP ACTION PASSIVE INLINE AIR VALVE

STATEMENT OF GOVERNMENT INTEREST

This invention was made with government support under Contract No. FA8626-16-C-2139, awarded by the United States Air Force. The government has certain rights in the invention.

BACKGROUND

The present disclosure relates to a self-actuated bleed valve for assisting start-up of a gas turbine engine.

Gas turbine engines are provided with a number of functional sections, including a fan section, a compressor section, a combustion section, and a turbine section. Air and fuel are combusted in the combustion section. The products of the combustion section move downstream, and pass over a series of turbine rotors in the turbine section, thereby driving the turbine rotors to provide power. The turbine rotors in the turbine section drive the compressor section and the fan section.

At start-up, the turbine section of the gas turbine engine takes time to fully provide power to the compressor section and fan section. Thus, driving the compressor section at start-up is more challenging for the turbine section than at steady state conditions. Prior art gas turbine engines generally include a bleed valve to bleed air away from the compressor section during start-up to reduce the load the turbine section experiences from the compressor section. The valve is open at start-up and moved to a closed position after start-up has been completed.

At least some prior art bleed valves include a poppet valve design that requires a large geometric area to meet a specified flow effective area. The large geometric area required by this poppet bleed valve can create a relatively tortuous flowpath for the air traveling through the poppet bleed valve, which leads to undesirable pressure losses. Furthermore, the poppet bleed valve is generally mounted to a bulkhead or duct in a cantilever fashion which can be prone to vibration issues. Additionally, this poppet bleed valve includes a fixed closing trigger pressure, which cannot be adjusted or recalibrated throughout the life of the valve.

SUMMARY

In one aspect of the invention, a valve assembly includes a flow duct with an inlet and an outlet downstream from the inlet. A piston housing is inside the flow duct between the inlet and the outlet so as to form an annular flow passage between the flow duct and the piston housing. The piston housing is axially aligned with a center axis of the flow duct. A piston is inside the piston housing and is configured to extend downstream of the piston housing in a closed position. A spring is at least partially inside the piston and contacts the piston and biases the piston to an open position. A fluid chamber is between the piston and an upstream end of the piston housing. A control opening extends through the upstream end of the piston housing and fluidically communicates with the flow duct and the fluid chamber. A control piston and a control spring are inside the piston housing. The control spring biases the control piston toward a first position that obstructs the control opening.

In another aspect of the invention, a bleed valve assembly includes a flow duct with an inlet and an outlet downstream from the inlet. A piston housing is inside the flow duct between the inlet and the outlet so as to form an annular flow passage between the flow duct and the piston housing. The piston housing is axially aligned with a center axis of the flow duct. A guide tube is inside the piston housing and extends from an upstream end of the piston housing towards the outlet of the flow duct along a center axis of the piston housing. A piston is inside the piston housing and configured to extend downstream of the piston housing in a closed position, and configured to slide on the guide tube. A fluid chamber is between the piston and the upstream end of the piston housing. A control opening extends through the upstream end of the piston housing and fluidically communicates with an interior of the guide tube. A hole extends through a wall of the guide tube and connects the fluid chamber with the interior of the guide tube. A control piston is inside the guide tube and blocks the hole from the control opening when in a first position. A control seat is inside the guide tube opposite the control piston. A control spring is between the control piston and the control seat, and biases the control piston toward the first position.

In another aspect of the invention, a valve assembly includes a flow duct with an inlet and an outlet downstream from the inlet. A piston housing is inside the flow duct between the inlet and the outlet so as to form an annular flow passage between the flow duct and the piston housing. The piston housing is axially aligned with a center axis of the flow duct. A piston is inside the piston housing and is configured to extend downstream of the piston housing in a closed position. A fluid chamber is between the piston and an upstream end of the piston housing. A fluid passage extends through the upstream end of the piston housing and connects the flow duct with the fluid chamber. A control piston and a control spring are inside the piston housing. The control spring biases the control piston toward a first position that obstructs the fluid passage. A control seat is in contact with the control spring opposite the control piston. A position of the control seat is adjustable relative the control piston.

Persons of ordinary skill in the art will recognize that other aspects and embodiments of the present invention are possible in view of the entirety of the present disclosure, including the accompanying figures.

Figure 1:
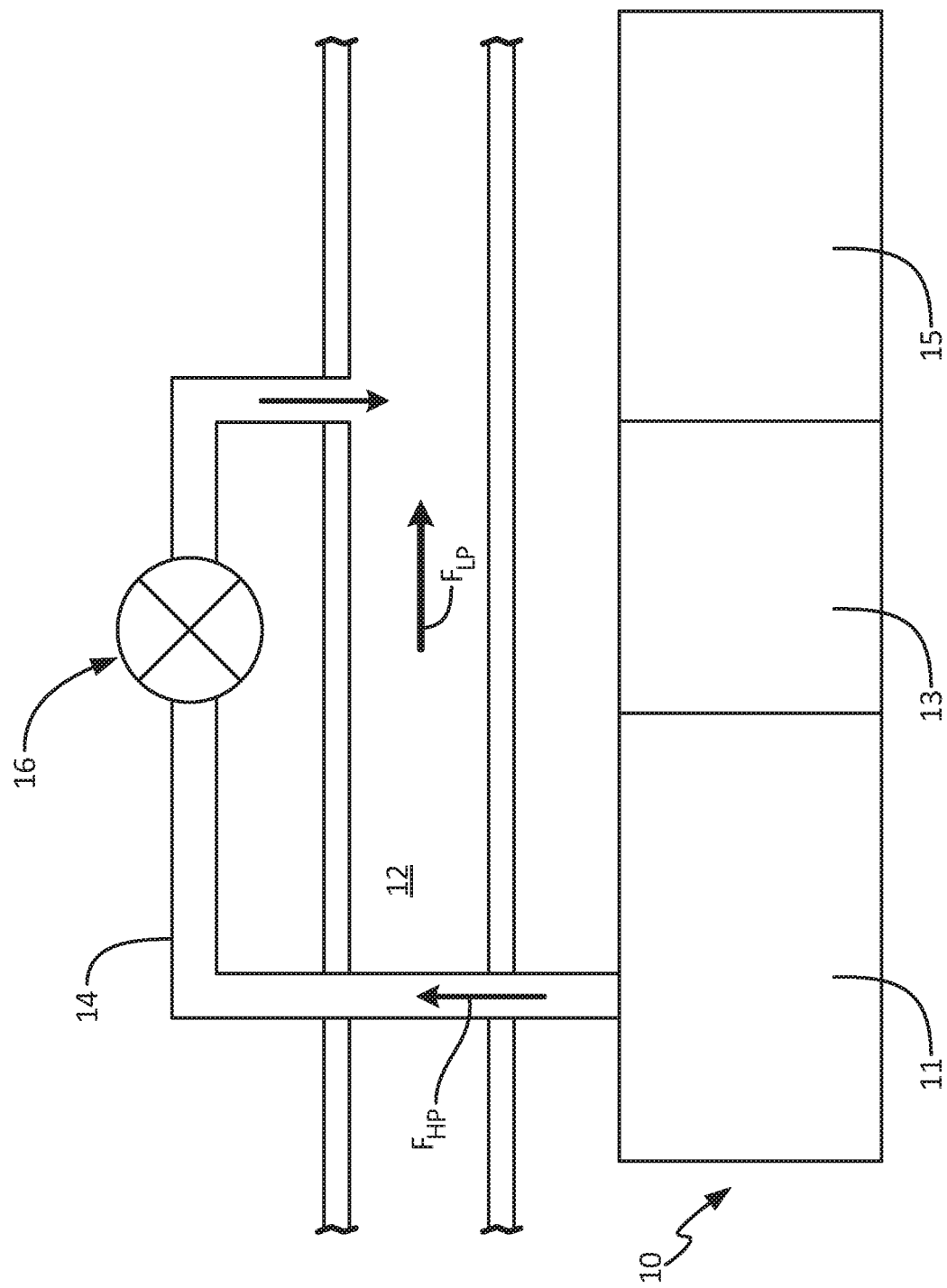
FIG. 1 is a schematic diagram of a gas turbine engine core, a bypass stream, a bleed duct, and bleed valve assembly.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides a self-actuated bleed valve assembly that is disposed in-line with a flow duct for bleeding air from a compressor stage of a gas turbine engine at start-up. A streamlined piston housing is disposed inside the flow duct between an inlet and an outlet of the flow duct, and the piston housing is axially aligned with a center axis of the flow duct. A piston is disposed inside the piston housing and is configured to extend downstream of the piston housing in a closed position. The bleed valve assembly can incorporate a spring between the piston housing and the piston to keep the piston at an open position during start-up of the gas turbine engine. As described below with reference to the Figures, the bleed valve assembly includes a passive control mechanism that ensures that the piston snaps between closed and open positions, and that the piston does not rest at steady state between the closed and open positions. The passive control mechanism is adjustable so that the delta pressure across the valve for which the valve will close can be adjusted.

FIG. 1 is a schematic diagram of gas turbine engine core 10, bypass stream 12, bleed duct 14, and bleed valve assembly 16. During operation, high pressure fluid $F_{HP}$ flows through gas turbine engine core 10 and lower pressure fluid $F_{LP}$ travels through bypass stream 12. High pressure fluid $F_{HP}$ and lower pressure fluid $F_{LP}$ can both be air, and high pressure fluid $F_{HP}$ travels through gas turbine engine core 10 at a higher pressure than the pressure at which lower pressure fluid $F_{LP}$ travels through bypass stream 12. Gas turbine engine core 10 can be a conventional gas turbine engine core with compressor section 11, combustion section 13, and turbine section 15 that drives compressor section 11.

Bypass stream 12 can be a conventional gas turbine engine bypass duct disposed radially outward from gas turbine engine core 10. Alternatively, bypass stream 12 can simply be a vent to atmosphere. Bleed duct 14 fluidically connects compressor section 11 of gas turbine engine core 10 to bypass stream 12. Bleed valve assembly 16 is connected in-line to bleed duct 14 and controls the flow of fluid through bleed duct 14. At start-up, bleed valve assembly 16 is at an open position so that at least a portion of high pressure fluid $F_{HP}$ in compressor section 11 can bleed away through bleed duct 14 to bypass stream 12. By allowing high pressure fluid $F_{HP}$ to bleed away from compressor section 11 of gas turbine engine core 10 to bypass stream 12 at start-up, bleed duct 14 and bleed valve assembly 16 reduce the load turbine section 15 experiences from compressor section 11. Once start-up is complete and turbine section 15 is fully powering compressor section 11, bleed valve assembly 16 self-actuates to a closed position to stop the flow of high pressure fluid $F_{HP}$ through bleed duct 14. When gas turbine engine core 10 is powered-down, bleed valve assembly 16 self-actuates back to the open position to await the next instance of start-up of gas turbine engine core 10. An embodiment of bleed valve assembly 16 is discussed below with reference to FIG. 2.

Figure 2:
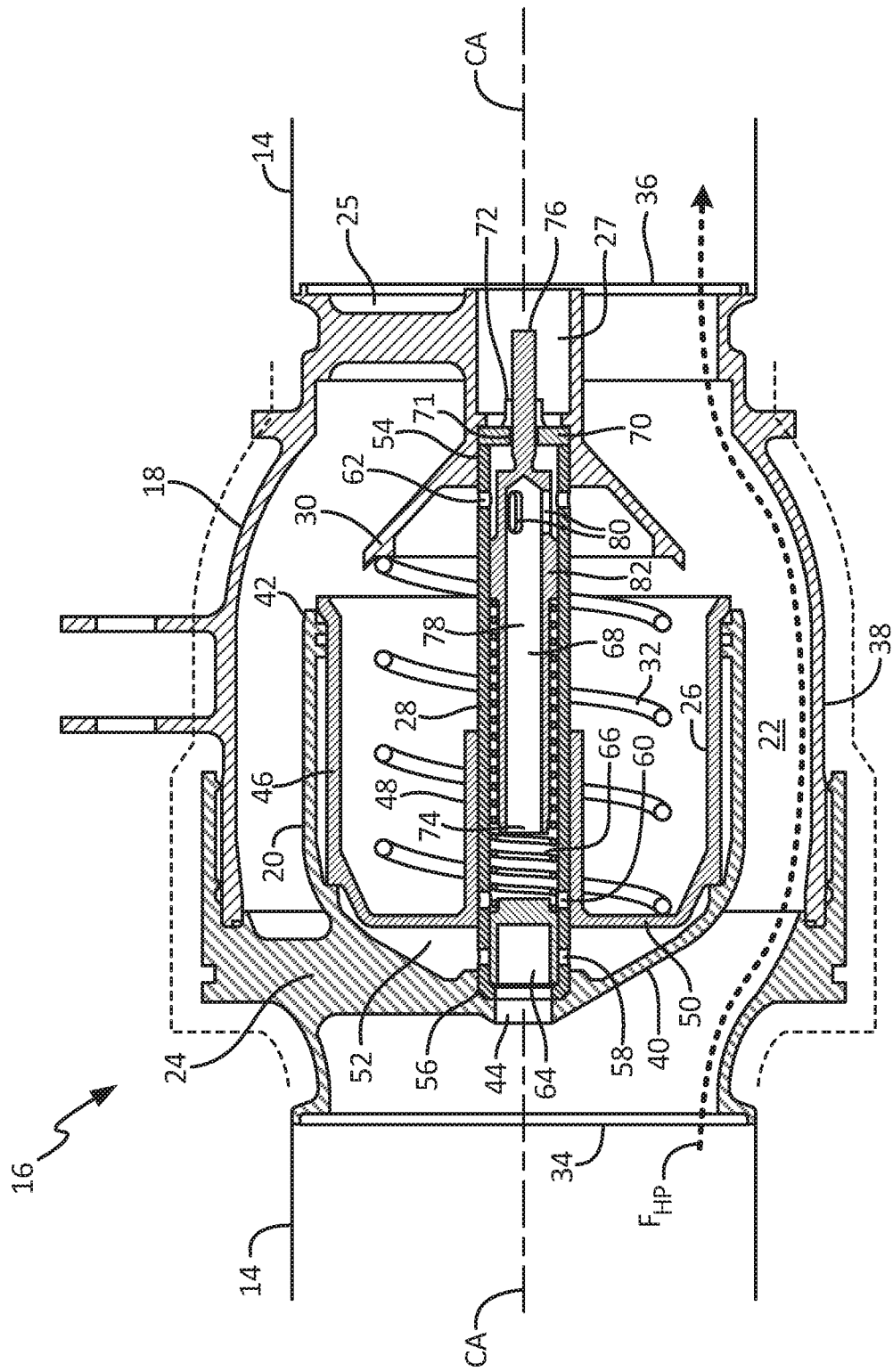
FIG. 2 is a cross-sectional view of a self-actuated inline bleed valve in an open position.

FIG. 2 is a cross-sectional view of bleed valve assembly 16 in an open position. As shown in FIG. 2, bleed valve assembly 16 includes flow duct 18, piston housing 20, annular flow passage 22, first set of ribs 24, second set of ribs 25, piston 26, guide tube 28, spring seat 30, and spring 32. Flow duct 18 forms inlet 34 and outlet 36 of bleed valve assembly 16 and flow duct 18 can include intermediate region 38, and center axis CA. Piston housing 20 includes upstream end 40, downstream end 42, and control opening 44. Piston 26 includes outer wall 46, hub 48, and working surface 50. Bleed valve assembly 16 also includes fluid chamber 52. Guide tube 28 includes axially spaced downstream end 54 and upstream end 56, a first plurality of holes 58, a second plurality of holes 60, and a third plurality of holes 62. Bleed valve assembly 16 also includes control piston 64, control spring 66, control seat 68, plate 70 with threaded hole 71, and locking nut 72. The embodiment of control seat 68 shown in FIG. 2 includes upstream end 74, downstream end 76, central bore 78, a plurality of ports 80, and threaded region 82.

As shown in FIG. 2, flow duct 18 of bleed valve assembly 16 is disposed in-line with bleed duct 14 and can form a portion bleed duct 14. Because flow duct 18 of bleed valve assembly 16 is disposed in-line with bleed duct 14, both inlet 34 and outlet 36 of flow duct 18 are aligned along center axis CA of flow duct 18. Outlet 36 is disposed downstream from inlet 34 and intermediate region 38 extends between inlet 34 and outlet 36.

Piston housing 20 is disposed entirely inside flow duct 18 and can also be axially aligned with center axis CA of flow duct 18 such that center axis CA can form the center axis for both flow duct 18 and piston housing 20. Piston housing 20 is positioned within intermediate region 38 of flow duct 18 between inlet 34 and outlet 36. Intermediate region 38 can be larger in cross-sectional area than both outlet 36 and inlet 34 so as to accommodate piston housing 20 without decreasing the cross-sectional flow area inside flow duct 18 between inlet 34 and outlet 36. Intermediate region 38 of flow duct 18 is sufficiently larger in cross-sectional area than piston housing 20 so as to form annular flow passage 22 between flow duct 18 and piston housing 20. Upstream end 40 of piston housing 20 is positioned proximate inlet 34 of flow duct 18. The first set of ribs 24, only one of which is shown in FIG. 2, extend from flow duct 18 to upstream end 40 of piston housing 20 to both connect and space piston housing 20 from flow duct 18. Downstream end 42 of piston housing 20 is spaced axially and disposed downstream from upstream end 40 of piston housing 20 and forms an opening for receiving piston 26. To streamline bleed valve assembly 16 and reduce pressure losses at inlet 34 of bleed valve assembly 16, upstream end 40 of piston housing 20 curves and tapers inward in an upstream direction.

Guide tube 28 is at least partially disposed inside piston housing 20 and extends between inlet 34 and outlet 36 of flow duct 18 along center axis CA. Upstream end 56 of guide tube 28 is connected to and supported by upstream end 40 of piston housing 20. Guide tube 28 extends from upstream end 40 of piston housing 20 towards outlet 36 of flow duct 18 along center axis CA. Downstream end 54 of guide tube 28 is connected to downstream hub 27, which is in turn supported and centered inside flow duct 18 by the second set of ribs 25. Guide tube 28 serves as a slide track to guide the movement of piston 26 inside piston housing 20 and flow duct 18.

Piston 26 is disposed entirely inside flow duct 18 and at least partially inside piston housing 20 on guide tube 28. Hub 48 of piston 26 is disposed at an axial center of piston 26 and is configured to receive guide tube 28. When piston 26 is assembled inside piston housing 20, hub 48 is axially aligned with center axis CA. Outer wall 46 of piston 26 is disposed radially outward from hub 48 and forms an outer diameter of piston 26 relative center axis CA. Outer wall 46 of piston 26 closes annular flow passage 22 proximate outlet 36 when piston 26 is extended downstream of piston housing 20 to a closed position. Working surface 50 extends between hub 48 and outer wall 46 of piston 26 and connects outer wall 46 to hub 48.

Spring seat 30 is connected to downstream hub 27 and is structurally supported by downstream hub 27 and the second set of ribs 25. Outer wall 46 of piston 26 is larger in diameter than spring seat 30 so that piston 26 can extend past spring seat 30 when in the closed position. Spring seat 30 tapers inward to downstream hub 27 to reduce turbulence and pressure losses proximate outlet 36. Spring 32 is disposed around guide tube 28 and compressed between spring seat 30 and working surface 50 of piston 26. As shown in FIG. 2, spring 32 is a coil spring, but other embodiments can include any other kind of spring suitable for exerting a force opposite working surface 50 of piston 26 and a force against spring seat 30. As shown in FIG. 2, spring 32 biases piston 26 such that piston 26 is at the open position during engine start-up and during engine rest.

Fluid chamber 52 is formed inside piston housing 20 between piston 26 and upstream end 40 of piston housing 20. Control opening 44 extends through upstream end 40 of piston housing 20 and fluidically communicates with an interior of guide tube 28 and flow duct 18. The first plurality of holes 58 (two of which are shown in FIG. 2) extend through a wall of guide tube 28 and fluidically connect fluid chamber 52 with the interior of guide tube 28. Together, control opening 44, guide tube 28, and the first plurality of holes 58 form a fluid passage that fluidically connects flow duct 18 and fluid chamber 52.

Control piston 64 and control spring 66 are disposed inside guide tube 28, and control seat 68 is at least partially disposed inside guide tube 28 opposite control piston 64. Control spring 66 is compressed between control piston 64 and control seat 68, and biases control piston 64 toward control opening 44. As shown in FIG. 2, control piston 64 is in a first position where control piston 64 obstructs control opening 44 and blocks the first plurality of holes 58 from control opening 44. When control piston 64 is in the first position, the high pressure fluid $F_{HP}$ entering flow duct 18 is unable to enter fluid chamber 52 in sufficient quantity and pressure to overcome the preload force of spring 32 and move piston 26 to the closed position. As discussed in greater detail below with reference to FIGS. 3 and 4, when the static pressure of the high pressure fluid $F_{HP}$ impinging on control piston 64 increases above a preload force of control spring 66, the high pressure fluid $F_{HP}$ moves control piston 64 toward upstream end 74 of control seat 68 and to a second position. In the second position, the first plurality of holes 58 are unobstructed by control piston 64, and a portion of the high pressure fluid $F_{HP}$ is able to pass through control opening 44 into guide tube 38, and enter fluid chamber 52 through the first plurality of holes 58. Spring 32 can have a lower preload force than control spring 66, such that the portion of high pressure fluid $F_{HP}$ entering fluid chamber 52 quickly pushes piston 26 to the closed position. When piston 26 is in the closed position, piston 26 blocks outlet 36 of flow duct 18, allowing the pressure of the high pressure fluid $F_{HP}$ to further build up in gas turbine engine core 10 (shown in FIG. 1).

At shutdown of gas turbine engine core 10, the static pressure inside flow duct 18 decreases below the preload force of control spring 66, allowing control spring 66 to move control piston 64 back to the first position at upstream end 56 of guide tube 28. The second plurality of holes 60 and the third plurality of holes 62 are formed in the wall of the guide tube 28 so that fluid can exit fluid chamber 52 and allow piston 26 to retract into piston housing 20 and return to the open position. The second plurality of holes 60 are positioned axially on guide tube 28 between control seat 68 and the first position of control piston 64. The third plurality of holes 62 are positioned axially on guide tube 28 between piston housing 20 and outlet 36 of flow duct 18. Together, the second plurality of holes 60 and the third plurality of holes 62 fluidically connect fluid chamber 52 with the interior of guide tube 28 and outlet 36 of flow duct 18 when piston 26 is in the closed position and control piston 64 is in the first position.

As shown in FIG. 2, the position of control seat 68 inside guide tube 28 is adjustable. Adjusting the position of control seat 68 relative control piston 64 inside guide tube 28 modifies the preload force on control spring 66, thereby changing the pressure at which control piston 64 will move between the first and second positions, and the pressure at which piston 26 will snap to the closed position. Thus, with adjustable control seat 68, bleed valve assembly 16 can be tuned and recalibrated to passively close at a specific pressure depending on operating requirements without the use of external active control mechanisms (such as solenoids). In the embodiment of FIG. 2, plate 70 is connected to downstream end 54 of guide tube 28, and downstream end 76 of control seat 68 is threaded and received into threaded hole 71 of plate 70. Threaded downstream end 76 of control seat 68 extends through threaded hole 71, and locking nut 72 is threaded onto downstream end 76 of control seat 68 to maintain the axial position of control seat 68 inside guide tube 28. To adjust the pressure that will trigger piston 26 to move to the closed position, locking nut 72 is loosened, and downstream end 76 of control seat 68 is turned to adjust the compression of control spring 66. After turning of control seat 68 is completed, locking nut 72 is retightened to fix the axial position of control seat 68.

In the embodiment of FIG. 2, upstream end 74 of control seat 68 is smaller in diameter than control spring 66 so that upstream end 74 can extend within spring 66 toward control piston 64 to provide a stop for control piston 64 to engage when control piston 64 is in the second position. Region 82 of control seat 68 is larger in diameter than upstream end 74 and provides a seating surface that engages control spring 66. In the embodiment of FIG. 2, region 82 of control seat 68 is threaded inside guide tube 28. In other embodiments, region 82 of control seat 68 can have a smooth surface without threads. Central bore 78 and ports 80 are formed in control seat 68 to allow fluid to flow across control seat 68 between the second plurality of holes 60 and the third plurality of holes 62. As discussed in greater detail below with reference to FIGS. 3 and 4, control piston 64, control spring 66, and control seat 68 passively control bleed valve assembly 16 through all operational stages of gas turbine engine core 10 (shown in FIG. 1).

Figure 3:
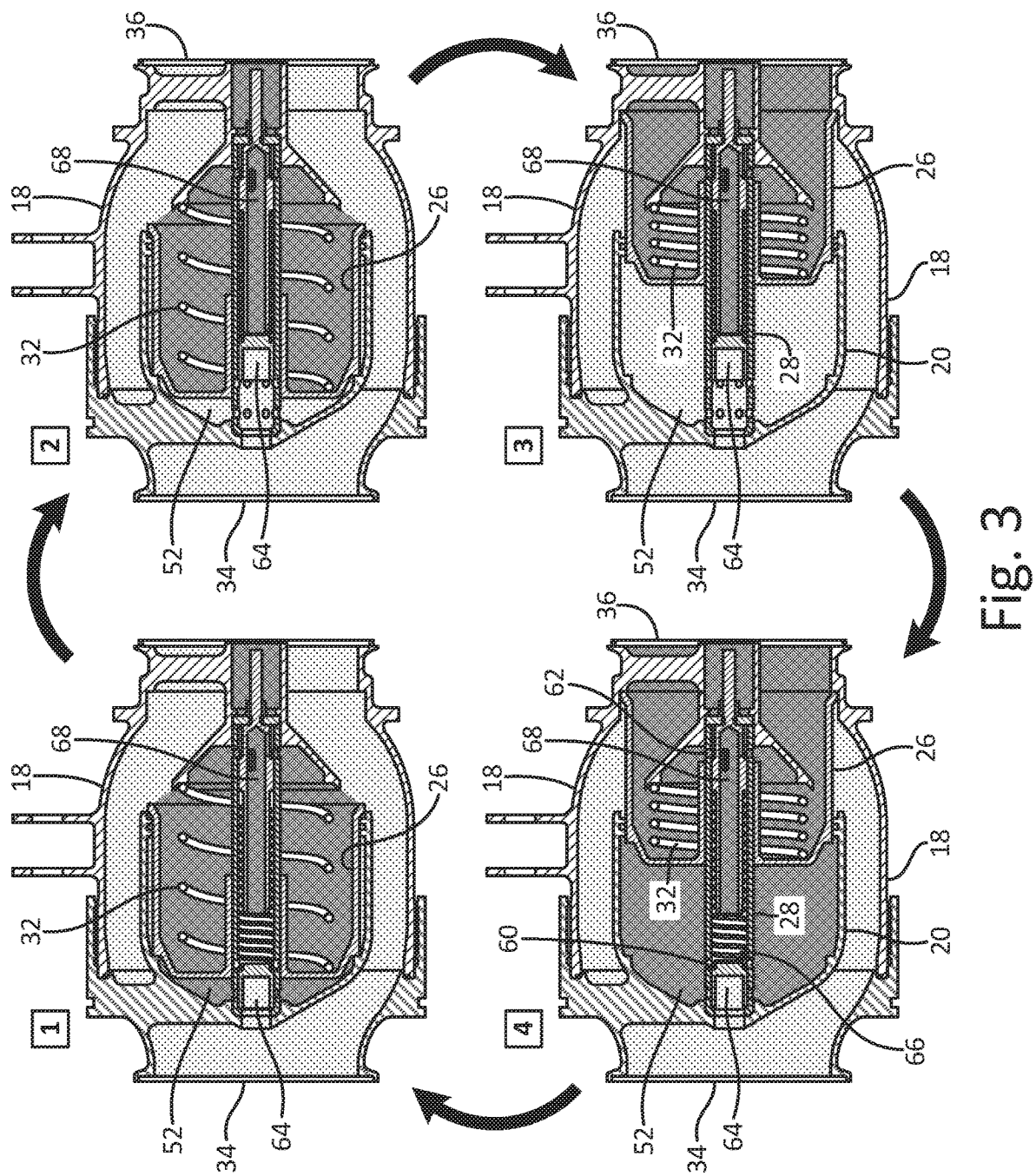
FIG. 3 is a diagram of a cycle of the self-actuated inline bleed valve of FIG. 2.
Figure 4:
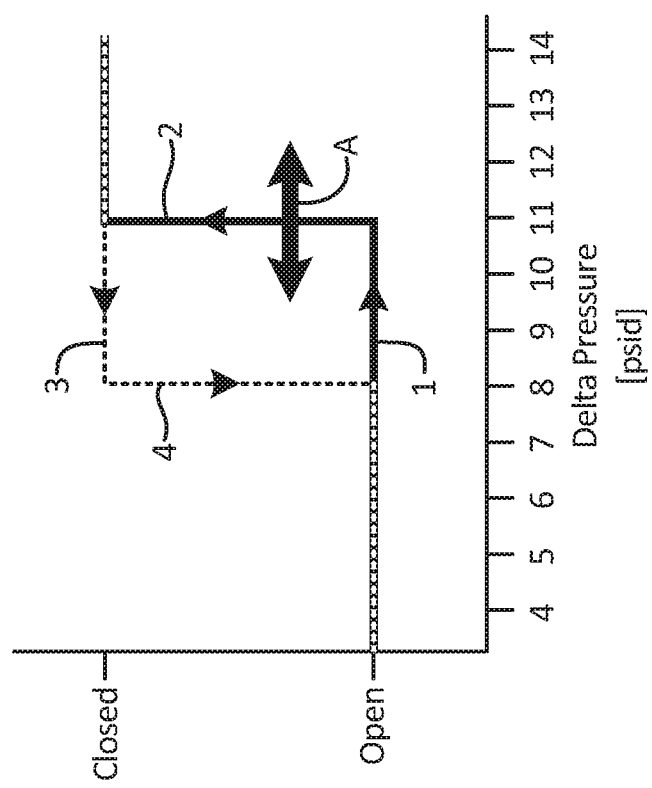
FIG. 4 is a chart of the cycle of the self-actuated inline bleed valve of FIG. 3.

FIGS. 3 and 4 will be discussed concurrently. FIG. 3 is a four-frame diagram of a cycle of self-actuated bleed valve assembly 16. FIG. 4 is a chart of the cycle of the self-actuated inline bleed valve of FIG. 3, with the y-axis representing the position of piston 26 and the x-axis representing the pressure inside flow duct 18 proximate inlet 34. Frame 1 in FIG. 3 is represented on the chart of FIG. 4 as line 1. Frame 2 in FIG. 3 is represented on the chart of FIG. 4 as line 2. Frames 3 and 4 in FIG. 3 are represented on the chart of FIG. 4 as lines 3 and 4 respectively.

Frame 1 of FIG. 3 and line 1 of FIG. 4 represent the state of bleed valve assembly 16 at startup of gas turbine engine core 10 (shown in FIG. 1). At startup of gas turbine engine core 10, the pressure in inlet 34 of flow duct 18 is low, piston 26 is in the open position, and control piston 64 is in the first position described above with reference to FIG. 2. Piston 26 and control piston 64 remain steady in the open and first positions respectively until the pressure in inlet 34 builds and reaches a trigger pressure, which is represented by the intersection of lines 1 and 2 in FIG. 4. The trigger pressure can also be the pressure at which gas turbine engine core 10 has reached operational power and pressure, and the end of the startup phase.

As illustrated by frame 2 of FIG. 3 and line 2 of FIG. 4, upon attaining the trigger pressure in inlet 34 of flow duct 18, control piston 64 self-actuates to the second position 24 against control seat 68, allowing fluid chamber 52 to rapidly fill and rapidly push piston 26 in a quick snap action to the closed position, shown in frame 3. Bleed valve assembly 16 remains steady in the state shown in frame 3 of FIG. 3 (with control piston 64 in the second position and piston 26 in the closed position) as gas turbine engine core 10 (shown in FIG. 1) maintains the pressure in inlet 34 above the trigger pressure.

When gas turbine engine core 10 eventually powers down, the pressure in inlet 34 begins to drop, as represented by line 3 in FIG. 4. As the pressure in inlet 34 falls below the trigger pressure, control piston 64 moves to the first position, as shown in frame 4. After control piston 64 moves to the first position, the fluid inside fluid chamber 52 rapidly vents out of fluid chamber 52 through the second plurality of holes 60, guide tube 28, and the third plurality of holes 62. As the fluid rapidly vents out of fluid chamber 52, in a snap action, spring 32 quickly pushes piston 26 into the open position, shown in frame 1 of FIG. 3 and line 4 of FIG. 4. With control piston 64 in the first position and piston 26 in the open position, as shown in frame 1, bleed valve assembly 16 is in a ready position for the next start up iteration of gas turbine engine core 10. As shown in FIG. 4, the trigger pressure, which is represented by the position of line 2 on the x-axis, is adjustable, as represented by left-right arrow A. As already discussed above with reference to FIG. 2, the trigger pressure of bleed valve assembly 16 is modified by adjusting the position of control seat 68 inside guide 28 relative control piston 64. Adjusting the position of control seat 68 modifies the compression of control spring 66 and the amount of pressure necessary overcome control spring 66 to move control piston 64 to the second position. Because the trigger pressure of bleed valve assembly 16 is adjustable, bleed valve assembly 16 can be recalibrated should changes occur over time in bleed valve assembly 16 (such as control spring 66 undergoing high temperature relaxation), or should pressure requirements change in gas turbine engine core 10.

In view of the foregoing description, it will be recognized that the present disclosure provides numerous advantages and benefits. For example, the present disclosure provides bleed valve assembly 16. Flow duct 18, inlet 34 and outlet 36 of flow duct 18, piston housing 20, and piston 26 are all disposed in-line along center axis CA. Because flow duct 18, inlet 34 and outlet 36 of flow duct 18, piston housing 20, and piston 26 are all disposed in-line along center axis CA, the flow path across bleed valve assembly 16 is relatively straight, especially when compared to the tortuous flow paths of prior art bleed valves, thereby reducing the pressure losses associated with prior art bleed valves. Furthermore, bleed valve assembly 16 includes control piston 64, control spring 66, and control seat 68. Control piston 64, control spring 66, and control seat 68 together form a passive control mechanism for bleed valve assembly 16 that allows bleed valve assembly 16 to self-actuate, thereby eliminating the need for an external controller, such as a solenoid. Control piston 64, control spring 66, and control seat 68 together set the pressure that triggers piston 26 to snap close or snap open. Spring 32 has a lower preload force than control spring 66, thus spring 32 does not allow piston 26 to stall in an intermediate position between the open position and the closed position. The adjustability of control seat 68 allows bleed valve assembly 16 to be recalibrated and adjusted throughout the product life.

The following are non-exclusive descriptions of possible embodiments of the present invention.

In one embodiment, a valve assembly includes a flow duct with an inlet and an outlet downstream from the inlet. A piston housing is inside the flow duct between the inlet and the outlet so as to form an annular flow passage between the flow duct and the piston housing. The piston housing is axially aligned with a center axis of the flow duct. A piston is inside the piston housing and is configured to extend downstream of the piston housing in a closed position. A spring is at least partially inside the piston and contacts the piston and biases the piston to an open position. A fluid chamber is between the piston and an upstream end of the piston housing. A control opening extends through the upstream end of the piston housing and fluidically communicates with the flow duct and the fluid chamber. A control piston and a control spring are inside the piston housing. The control spring biases the control piston toward a first position that obstructs the control opening.

The valve assembly of the preceding paragraph can optionally include, additionally and/or alternatively, any one or more of the following features, configurations and/or additional components:

a control seat in contact with the control spring opposite the control piston, wherein a position of the control seat is adjustable relative the control piston;

a guide tube inside the piston housing, wherein the guide tube extends from the upstream end of the piston housing towards the outlet of the flow duct along a center axis of the piston housing, and wherein the piston is configured to slide on the guide tube;

the guide tube fluidically communicates with the control opening and the fluid chamber, wherein the control piston and the control spring are inside the guide tube, and wherein the control seat is at least partially inside the guide tube;

a first hole extending through a wall of the guide tube, wherein the first hole fluidically connects the fluid chamber with an interior of the guide tube; a second hole extending through the wall of the guide tube, wherein the second hole is positioned axially between the first hole and the control seat between the control seat and the first position of the control piston; and a third hole extending through the wall of the guide tube, wherein the third hole is positioned axially on the guide tube between the piston housing and the outlet of the flow duct, wherein the control piston blocks the first hole from the control opening in a first position, and wherein the second hole and the third hole fluidically connect the fluid chamber with the interior of the guide tube and the outlet of the flow duct when the piston is in the closed position and the control piston is in the first position;

a plate is connected to a downstream end of the guide tube, wherein the plate includes a threaded hole, and the control seat includes a threaded end inserted into the threaded hole; and/or the threaded end of the control seat extends through the threaded hole of the plate, and a locking nut is threaded onto the threaded end of the control seat.

In another embodiment, a bleed valve assembly includes a flow duct with an inlet and an outlet downstream from the inlet. A piston housing is inside the flow duct between the inlet and the outlet so as to form an annular flow passage between the flow duct and the piston housing. The piston housing is axially aligned with a center axis of the flow duct. A guide tube is inside the piston housing and extends from an upstream end of the piston housing towards the outlet of the flow duct along a center axis of the piston housing. A piston is inside the piston housing and configured to extend downstream of the piston housing in a closed position, and configured to slide on the guide tube. A fluid chamber is between the piston and the upstream end of the piston housing. A control opening extends through the upstream end of the piston housing and fluidically communicates with an interior of the guide tube. A hole extends through a wall of the guide tube and connects the fluid chamber with the interior of the guide tube. A control piston is inside the guide tube and blocks the hole from the control opening when in a first position. A control seat is inside the guide tube opposite the control piston. A control spring is between the control piston and the control seat, and biases the control piston toward the first position.

The bleed valve assembly of the preceding paragraph can optionally include, additionally and/or alternatively, any one or more of the following features, configurations and/or additional components:

a position of the control seat inside the guide tube is adjustable;

a plate is connected to a downstream end of the guide tube, wherein the plate includes a threaded hole, and the control seat includes a threaded end inserted into the threaded hole;

the threaded end of the control seat extends through the threaded hole of the plate, and a locking nut is threaded onto the threaded end of the control seat;

a spring at least partially inside the piston, wherein the spring contacts the piston and biases the piston to an open position;

a spring seat connected to a downstream end of the guide tube, wherein the spring seat is smaller in diameter than an outer diameter of the piston, wherein the spring is disposed between the piston and the spring seat;

at least one rib extending radially inward from the flow duct to support the spring seat and the downstream end of the guide tube; and/or a second hole extending through the wall of the guide tube, wherein the second hole is positioned axially between the control seat and the first position of the control piston; and a third hole extending through the wall of the guide tube, wherein the third hole is positioned axially on the guide tube between the piston housing and the outlet of the flow duct, wherein the second hole and the third hole fluidically connect the fluid chamber with the interior of the guide tube and the outlet of the flow duct when the piston is in the closed position and the control piston is in the first position.

In another embodiment, a valve assembly includes a flow duct with an inlet and an outlet downstream from the inlet. A piston housing is inside the flow duct between the inlet and the outlet so as to form an annular flow passage between the flow duct and the piston housing. The piston housing is axially aligned with a center axis of the flow duct. A piston is inside the piston housing and is configured to extend downstream of the piston housing in a closed position. A fluid chamber is between the piston and an upstream end of the piston housing. A fluid passage extends through the upstream end of the piston housing and connects the flow duct with the fluid chamber. A control piston and a control spring are inside the piston housing. The control spring biases the control piston toward a first position that obstructs the fluid passage. A control seat is in contact with the control spring opposite the control piston. A position of the control seat is adjustable relative the control piston.

The valve assembly of the preceding paragraph can optionally include, additionally and/or alternatively, any one or more of the following features, configurations and/or additional components:

a guide tube inside the piston housing, wherein the guide tube extends from the upstream end of the piston housing towards the outlet of the flow duct along a center axis of the piston housing, and wherein the piston is configured to slide on the guide tube;

the guide tube forms a portion of the fluid passage, wherein the control piston and the control spring are inside the guide tube, and wherein the control seat is at least partially inside the guide tube;

a plate is connected to a downstream end of the guide tube, wherein the plate includes a threaded hole, and the control seat includes a threaded end inserted into the threaded hole; and/or the threaded end of the control seat extends through the threaded hole of the plate, and a locking nut is threaded onto the threaded end of the control seat.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIGS. 2 and 3 show control piston 64, control spring 66, and control seat 68 disposed inside guide tube 28, other embodiments of the invention can position control piston 64, control spring 66, and control seat 68 in a different location. In addition, many modifications may be made to adapt a particular situation or material to the teachings of the invention without departing from the essential scope thereof. For example, while bleed valve assembly 16 has been described with reference to gas turbine engines, bleed valve assembly 16 can be used in any application where a self-actuated, in-line bleed valve is needed. Therefore, it is intended that the invention not be limited to the particular embodiment(s) disclosed, but that the invention will include all embodiments falling within the scope of the appended claims.

What is claimed is:

1. A valve assembly comprising:
    a flow duct comprising:
        an inlet; and
        an outlet downstream from the inlet;
    a piston housing inside the flow duct between the inlet and the outlet so as to form an annular flow passage between the flow duct and the piston housing, wherein the piston housing is axially aligned with a center axis of the flow duct;

a piston inside the piston housing and configured to extend downstream of the piston housing in a closed position;
a spring at least partially inside the piston, wherein the spring contacts the piston and biases the piston to an open position;
a fluid chamber between the piston and an upstream end of the piston housing;
a control opening extending through the upstream end of the piston housing, wherein the control opening fluidically communicates with the flow duct and the fluid chamber; and
a control piston and a control spring inside the piston housing, wherein the control spring biases the control piston toward a first position that obstructs the control opening.

2. The valve assembly of claim 1, further comprising:
a control seat in contact with the control spring opposite the control piston, wherein a position of the control seat is adjustable relative the control piston.

3. The valve assembly of claim 2, further comprising:
a guide tube inside the piston housing, wherein the guide tube extends from the upstream end of the piston housing towards the outlet of the flow duct along a center axis of the piston housing, and wherein the piston is configured to slide on the guide tube.

4. The valve assembly of claim 3, wherein the guide tube fluidically communicates with the control opening and the fluid chamber, wherein the control piston and the control spring are inside the guide tube, and wherein the control seat is at least partially inside the guide tube.

5. The valve assembly of claim 4, further comprising:
a first hole extending through a wall of the guide tube, wherein the first hole fluidically connects the fluid chamber with an interior of the guide tube;
a second hole extending through the wall of the guide tube, wherein the second hole is positioned axially between the control seat and the first position of the control piston; and
a third hole extending through the wall of the guide tube, wherein the third hole is positioned axially on the guide tube between the piston housing and the outlet of the flow duct,
wherein the control piston blocks the first hole from the control opening in a first position, and
wherein the second hole and the third hole fluidically connect the fluid chamber with the interior of the guide tube and the outlet of the flow duct when the piston is in the closed position and the control piston is in the first position.

6. The valve assembly of claim 4, wherein a plate is connected to a downstream end of the guide tube, wherein the plate includes a threaded hole, and the control seat includes a threaded end inserted into the threaded hole.

7. The valve assembly of claim 6, wherein the threaded end of the control seat extends through the threaded hole of the plate, and a locking nut is threaded onto the threaded end of the control seat.

8. A bleed valve assembly comprising:
a flow duct comprising:
an inlet; and
an outlet downstream from the inlet;
a piston housing inside the flow duct between the inlet and the outlet so as to form an annular flow passage between the flow duct and the piston housing, wherein the piston housing is axially aligned with a center axis of the flow duct;
a guide tube inside the piston housing, wherein the guide tube extends from an upstream end of the piston housing towards the outlet of the flow duct along a center axis of the piston housing;
a piston inside the piston housing and configured to extend downstream of the piston housing in a closed position, and configured to slide on the guide tube;
a fluid chamber between the piston and the upstream end of the piston housing;
a control opening extending through the upstream end of the piston housing, wherein the control opening fluidically communicates with an interior of the guide tube;
a hole extending through a wall of the guide tube, wherein the hole fluidically connects the fluid chamber with the interior of the guide tube;
a control piston inside the guide tube, wherein the control piston blocks the hole from the control opening in a first position;
a control seat inside the guide tube opposite the control piston; and
a control spring between the control piston and the control seat, wherein the control spring biases the control piston toward the first position.

9. The bleed valve assembly of claim 8, wherein a position of the control seat inside the guide tube is adjustable.

10. The bleed valve assembly of claim 9, wherein a plate is connected to a downstream end of the guide tube, wherein the plate includes a threaded hole, and the control seat includes a threaded end inserted into the threaded hole.

11. The bleed valve assembly of claim 10, wherein the threaded end of the control seat extends through the threaded hole of the plate, and a locking nut is threaded onto the threaded end of the control seat.

12. The bleed valve assembly of claim 8, further comprising:
a spring at least partially inside the piston, wherein the spring contacts the piston and biases the piston to an open position.

13. The bleed valve assembly of claim 12, wherein the bleed valve assembly further comprises:
a spring seat connected to a downstream end of the guide tube, wherein the spring seat is smaller in diameter than an outer diameter of the piston,
wherein the spring is disposed between the piston and the spring seat.

14. The bleed valve assembly of claim 13, wherein the bleed valve assembly further comprises:
at least one rib extending radially inward from the flow duct to support the spring seat and the downstream end of the guide tube.

15. The bleed valve assembly of claim 8, wherein the bleed valve assembly further comprises:
a second hole extending through the wall of the guide tube, wherein the second hole is positioned axially between the control seat and the first position of the control piston; and
a third hole extending through the wall of the guide tube, wherein the third hole is positioned axially on the guide tube between the piston housing and the outlet of the flow duct,
wherein the second hole and the third hole fluidically connect the fluid chamber with the interior of the guide tube and the outlet of the flow duct when the piston is in the closed position and the control piston is in the first position.

16. A valve assembly comprising:
a flow duct comprising:
  an inlet; and
  an outlet downstream from the inlet;
a piston housing inside the flow duct between the inlet and the outlet so as to form an annular flow passage between the flow duct and the piston housing, wherein the piston housing is axially aligned with a center axis of the flow duct;
a piston inside the piston housing and configured to extend downstream of the piston housing in a closed position;
a fluid chamber between the piston and an upstream end of the piston housing;
a fluid passage extending through the upstream end of the piston housing, wherein the fluid passage fluidically connects the flow duct with the fluid chamber; and
a control piston and a control spring inside the piston housing, wherein the control spring biases the control piston toward a first position that obstructs the fluid passage; and
a control seat in contact with the control spring opposite the control piston, wherein a position of the control seat is adjustable relative the control piston.

17. The valve assembly of claim 16, further comprising:
a guide tube inside the piston housing, wherein the guide tube extends from the upstream end of the piston housing towards the outlet of the flow duct along a center axis of the piston housing, and wherein the piston is configured to slide on the guide tube.

18. The valve assembly of claim 17, wherein the guide tube forms a portion of the fluid passage, wherein the control piston and the control spring are inside the guide tube, and wherein the control seat is at least partially inside the guide tube.

19. The valve assembly of claim 18, wherein a plate is connected to a downstream end of the guide tube, wherein the plate includes a threaded hole, and the control seat includes a threaded end inserted into the threaded hole.

20. The valve assembly of claim 19, wherein the threaded end of the control seat extends through the threaded hole of the plate, and a locking nut is threaded onto the threaded end of the control seat.

* * * * *